(12) United States Patent
Niimi et al.

(10) Patent No.: US 9,927,027 B2
(45) Date of Patent: Mar. 27, 2018

(54) AUTOMATIC TRANSMISSION

(71) Applicant: AISIN SEIKI KABUSHIKI KAISHA, Kariya-shi, Aichi-ken (JP)

(72) Inventors: Hideaki Niimi, Kariya (JP); Hideki Nakamura, Anjo (JP); Keita Suwa, Anjo (JP); Minoru Todo, Anjo (JP); Tsuyoshi Fukaya, Anjo (JP); Takuya Nakajima, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/466,944

(22) Filed: Mar. 23, 2017

(65) Prior Publication Data

US 2017/0276245 A1    Sep. 28, 2017

(30) Foreign Application Priority Data

Mar. 24, 2016    (JP) .................................. 2016-060762

(51) Int. Cl.
*F16H 63/30*    (2006.01)
*F16H 3/66*    (2006.01)
(Continued)

(52) U.S. Cl.
CPC .......... *F16H 63/3026* (2013.01); *B60T 1/062* (2013.01); *F16H 3/66* (2013.01); *F16D 55/24* (2013.01); *F16H 2063/303* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS 5,992,834 A * 11/1999 Dover ..................... F16D 13/52
188/72.3
8,123,014 B2 * 2/2012 Wooden ................. F16D 21/06
192/48.613
(Continued)

FOREIGN PATENT DOCUMENTS

JP    4-151059 A    5/1992
JP    5-340430 A    12/1993
JP    2015-124841 A    7/2015

*Primary Examiner* — Justin Holmes
(74) *Attorney, Agent, or Firm* — Buchanan Ingersoll & Rooney PC (57) ABSTRACT

The automatic transmission which includes a third brake element formed by a support member including a first cylindrical portion having a first sliding surface at an outer peripheral surface thereof, a second cylindrical portion having a second sliding surface at an inner peripheral surface thereof and a third cylindrical portion having a third sliding surface at an inner peripheral surface thereof, an inner side piston, inner edge portion of which is in contact with the first sliding surface and an outer edge portion of which is in contact with the second sliding surface and an outer side piston which includes a first piston cylindrical portion, outer edge of which is in contact with the second sliding surface over an entire periphery thereof and a second piston cylindrical portion, outer edge portion of which is in contact with the third sliding surface over an entire periphery thereof.

7 Claims, 4 Drawing Sheets

(51) Int. Cl.
*B60T 1/06* (2006.01)
*F16D 55/24* (2006.01)

(56) References Cited

U.S. PATENT DOCUMENTS

| | | | |
|---|---|---|---|
| 8,475,325 B2* | 7/2013 | Janson | F16H 57/082 475/284 |
| 2007/0155568 A1* | 7/2007 | Ishii | F16D 25/0638 475/116 |
| 2008/0300095 A1* | 12/2008 | Doi | F16H 3/66 475/276 |

* cited by examiner

|  | Cl1 | Cl2 | Cl3 | B1 | B2 | B3in | B3out |
|---|---|---|---|---|---|---|---|
| Rev |  |  |  | ○ | ○ | ○ | ○ |
| N |  |  |  |  |  | ○ | ○ |
| 1st | ○ |  |  | ○ |  | ○ | ○ |
| 2nd | ○ | ○ |  | ○ |  | ○ | ○ |
| 3rd |  | ○ |  |  |  | ○ | ○ |
| 4th |  |  | ○ | ○ |  |  | ○ |
| 5th |  | ○ | ○ | ○ |  |  |  |
| 6th | ○ | ○ | ○ | ○ |  |  |  |
| 7th | ○ |  | ○ | ○ |  |  |  |
| 8th | ○ |  | ○ |  | ○ |  |  |
| 9th |  |  | ○ | ○ | ○ |  |  |

AUTOMATIC TRANSMISSION

This application claims priority under 35 U.S.C. 119 with respect to Japanese Application No. 2016-060762 filed in Japan on Mar. 24, 2016, the entire content of which is herein incorporated by reference.

BACKGROUND OF THE INVENTION

This invention relates to an automatic transmission.

FIELD OF THE INVENTION

Discussion of the Related Art

Necessary torque capacity for a friction element of an automatic transmission depends on the speed gear stage in which the friction element is used. For example, when the shift gear is in reverse gear stage or in lower speed gear stages, a relatively larger torque capacity is necessary, but when the shift gear is in higher speed gear stages, a relatively smaller torque capacity is sufficient. Considering the above situation, a double chamber type friction element for an automatic transmission has been proposed, which is equipped with two hydraulic pressure chambers and two pistons to generate various engaging torques suitable for transmitting torques in different speed gear stages, using one single friction element properly. This friction element for an automatic transmission is shown in the Patent Document 1 (in this document, the friction element is used as a brake element). According to the automatic transmission of this document, depending on the necessary torque to be transmitted, if a large engaging torque is needed for brake operation, hydraulic pressure is supplied to both two hydraulic pressure chambers to generate a large torque and if a small engaging torque is sufficient for brake operation, the hydraulic pressure is supplied only to one of the two hydraulic pressure chambers. Thus, the torque is optimally generated depending on which speed gear stage the shift gear is in.

DOCUMENT LIST OF STATE OF ART

Patent Document

Patent Document 1: JP2015-124841 A

DISCLOSURE OF THE INVENTION

However, according to the disclosed structure of the Patent Document 1, since the two pistons and two hydraulic pressure chambers are provided, there needs twice number of sliding surfaces between the two chambers and the two pistons to which the O-ring seals are attached, compared to the single piston and single hydraulic chamber type brake element. Since the sliding surfaces are liquid-tightly provided by means of O-rings, it is necessary for the brake element to be precisely machined with a severe surface-roughness which should be equal to or less than a severely determined value and accordingly, it is necessary to be machined by cutting and grinding. Therefore, the automatic transmission equipped with the double chamber type brake element structure shown in the Patent Document 1 inevitably increases the machining cost and the manufacturing cost.

Means to Solve the Problems

The present invention was made in consideration with the above problems and the object of the invention is to provide an automatic transmission having a double chamber type brake element which manufacturing cost can be reduced.

In order to solve the problems, the automatic transmission according to the invention of claim 1 includes a housing a plurality of planetary gear mechanisms accommodated in the housing and arranged coaxially with a rotation axis line, a double chamber brake having a first hydraulic chamber and a second hydraulic chamber for connecting or disconnecting one element of one of the plurality of planetary gear mechanisms to or from the housing, wherein the double chamber brake includes a support member which is formed with a first cylindrical portion formed cylindrically and arranged coaxially with the rotation axis line, the first cylindrical portion having a first sliding surface on an outer peripheral surface thereof, a second cylindrical portion cylindrically formed and arranged coaxially with the first cylindrical portion at an outer peripheral surface side of the first cylindrical portion, the second cylindrical portion having a second sliding surface on an inner peripheral surface thereof, a connecting portion connecting the first cylindrical portion and the second cylindrical portion at each one end in a rotation axis line direction and a third cylindrical portion cylindrically formed and an inner diameter thereof being larger than an inner diameter of the second cylindrical portion and connected to the second cylindrical portion at another end thereof in the rotation axis line direction, the third cylindrical portion having a third sliding surface on an inner peripheral surface thereof, an inner side piston having an annular shape and provided with the first hydraulic pressure chamber between the connecting portion of the support member and the inner side piston, an inner edge portion of the inner side piston being in contact with an entire periphery of the first sliding surface of the first cylindrical portion of the support member and an outer edge portion being in contact with an entire periphery of the second sliding surface of the second cylindrical portion of the support member, an outer side piston provided adjacent to the inner side piston, the outer side piston having a first piston cylindrical portion formed cylindrically and arranged coaxially with the rotation axis line, an outer edge portion of the first piston cylindrical portion being in contact with an entire periphery of the second sliding surface, a second piston cylindrical portion cylindrically formed and arranged coaxially at an outer peripheral surface side of the first piston cylindrical portion with the first piston cylindrical portion, an outer edge portion of the second piston cylindrical portion being in contact with an entire periphery of the third sliding surface and a piston connecting portion formed with the second hydraulic pressure chamber between the second cylindrical portion and the piston connecting portion and connecting the first piston cylindrical portion and the second piston cylindrical portion, a plurality of outer plates, each having an annular plate shape and arranged along in the rotation axis line direction, the plurality of outer plates being prevented from moving in a peripheral direction relative to the housing and being allowed to be movable along the rotation axis line, the plurality of outer plates being pushed by the outer side piston; and a plurality of inner plates, each having an annular plate shape and each being provided between the outer plates, the plurality of the inner plates being prevented from moving in a peripheral direction relative to the one element of the one of the plurality of planetary gear mechanisms and being allowed to be movable along the rotation axis line.

As explained above, the support member has the first cylindrical portion having the first sliding surface at the outer peripheral surface thereof, the second cylindrical portion having the second sliding surface on the inner peripheral surface thereof and the third cylindrical portion having the inner diameter thereof being larger than the inner diameter of the second cylindrical portion and connected to the second cylindrical portion at end portion of the other end side in the rotation axis line direction of the second cylindrical portion, the third cylindrical portion having the third sliding surface on the inner peripheral surface thereof. The inner edge portion of the inner side piston is in contact with the entire periphery of the first sliding surface and the outer edge portion of the inner side piston is in contact with the entire periphery of the second sliding surface. Further, the outer edge portion of the first piston cylindrical portion of the outer side piston is in contact with the entire periphery of the second sliding surface and the outer edge portion of the second piston cylindrical portion of the outer side piston is in contact with the entire periphery of the third sliding surface. Thus, the outer edge portion of the inner side piston and the outer edge portion of the first piston cylindrical portion of the outer side piston are in contact with the entire periphery of the second sliding surface which is common to the inner side piston and the first piston cylindrical portion of the outer side piston. Therefore, there is no need to prepare four sliding surfaces on the support member and only three sliding surfaces may be provided to form the double chamber type brake element. As a result, one sliding surface may be eliminated from the support member, which leads to a reduction of manufacturing cost by reducing the machining cost to provide an automatic transmission with less cost in manufacturing.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

THE EMBODIMENT FOR IMPLEMENTING THE INVENTION (Structure of Automatic Transmission)

The automatic transmission 100 according to the embodiment will be explained hereinafter with reference to FIG. 1. The automatic transmission 100 is formed by a control portion 10, an input shaft 11, an output shaft 12, a housing 13, a first planetary gear mechanism PG1, a second planetary gear mechanism PG2, a third planetary gear mechanism PG3, a fourth planetary gear mechanism PG4, a first brake B1, a second brake B2, a third brake B3, a first clutch Cl1, a second clutch Cl2 and a third clutch Cl3. It is noted that the one-dot chain line shown in FIG. 1 indicates a rotation axis line 15 of each component and the rotation axis line 15 passes through the center of the housing 13 in a radial direction and extends in a longitudinal direction of the housing 13.

The housing 13 is formed in a cylindrical shape. The input shaft 11 is coaxially arranged with the rotation axis line 15 and is rotatably supported on the housing 13. The input shaft 11 is connected to an engine (not shown) through a torque converter (not shown) and the driving force is inputted from the engine. The output shaft 12 is coaxially arranged with the rotation axis line 15 at the rearward of the input shaft 11 and is rotatably supported on the housing 13. The output shaft 12 is connected to drive wheels (not shown) of a vehicle (not shown) through a differential gear (not shown).

The first planetary gear mechanism PG1, the second planetary gear mechanism PG2, the third planetary gear mechanism PG3 and the fourth planetary gear mechanism PG4 are accommodated in the housing 13 and are arranged in this order from input shaft 11 side towards the output shaft 12 side. The planetary gear mechanisms PG1 through PG4 are coaxially arranged with the rotation axis line 15. The type of the first planetary gear mechanism PG1 is a double pinion type gear mechanism, whereas the type of the other three planetary gear mechanisms PG2 through PG4 is a single pinion type gear mechanism.

The first planetary gear mechanism PG1 includes a first sun gear S1, a plurality of first inner pinions P1-1, a plurality of first outer pinions P1-2, a first carrier C1 and a first ring gear R1. The first sun gear S1 is supported on the housing 13 and rotatable about the rotation axis line 15. The plurality of the first inner pinions P1-1 is provided at the outer peripheral side of the first sun gear S1 and engages with the first sun gear S1. The plurality of the first outer pinions P1-2 is provided at the outer peripheral side of the first inner pinions P1-1 and engages therewith, respectively. The first carrier C1 rotatably supports the first inner pinions P1-1 and the first outer pinions P1-2. The first ring gear R1 is provided at the outer peripheral side of the first outer pinions P1-2 and engages therewith.

The second planetary gear mechanism PG2 includes a second sun gear S2, a plurality of second pinions P2, a second carrier C2 and a second ring gear R2. The third planetary gear mechanism PG3 includes a third sun gear S3, a plurality of third pinions P3, a third carrier C3 and a third ring gear R3. The fourth planetary gear mechanism PG4 includes a fourth sun gear S4, a plurality of fourth pinions P4, a fourth carrier C4 and a fourth ring gear R4.

Since the structures of the second through fourth planetary gear mechanisms PG2 through PG4 are the same, only the structure of the second planetary gear mechanism PG2 will be representatively explained in detail. The second sun gear S2 is supported on the housing 13 and rotatable about the rotation axis line 15. The plurality of the second pinions P2 is provided at the outer peripheral side of the second sun gear S2 and engages with the second sun gear S2. It is noted here that the expression "outer peripheral side" means the outer side of the rotation axis line 15 in a radial direction. The second carrier C2 rotatably supports the second pinions P2. The second ring gear R2 is provided at the outer peripheral side of the second pinions P2 and engages therewith.

The input shaft 11 and the first carrier C1 are connected by a first connecting member 21 and are integrally rotated as a unit. Similarly, the first ring gear R1 and the second ring gear R2 are connected by a second connecting member 22 and are integrally rotated as a unit. The second carrier C2 is connected to a third connecting member 23. The second sun gear S2, the third sun gear S3 and the fourth sun gear S4 are connected by a fourth connecting member 24 and are integrally rotated as a unit. The third carrier C3, the fourth ring gear R4 and the output shaft 12 are connected by a fifth connecting member 25 and are integrally rotated as a unit.

The first brake B1 connects or disconnects the first sun gear S1 to or from the housing 13. The second brake B2 connects or disconnects the third connecting member 23 to or from the housing 13 and accordingly, the second carrier C2 connected to the third connecting member 23 is connected to or disconnected from the housing 13. The third brake B3 connects or disconnects the third ring gear R3 to or from the housing 13. The three brakes B1 through B3 are fixed to the housing 13 connecting or disconnecting an element of the respective planetary gear mechanisms PG1 through PG3.

The first clutch Cl1 connects or disconnect the second connecting member 22 to or from the fourth connecting member 24. When the first clutch Cl1 is engaged, the second connecting member 22 and the fourth connecting member 24 are engaged (connected) and thus, the first ring gear R1, the second ring gear R2, the second sun gear S2, the third sun gear S3 and the fourth sun gear S4 are connected and are all integrally rotated as a unit. The second clutch Cl2 connects or disconnect the first carrier C1 to or from the third connecting member 23 and accordingly, the first carrier C1 is connected to or disconnected from the second carrier C2 by the second clutch Cl2. The third clutch Cl3 connects or disconnects the fourth carrier C4 with or from the input shaft 11 and the first connecting member 21.

Figure 2:
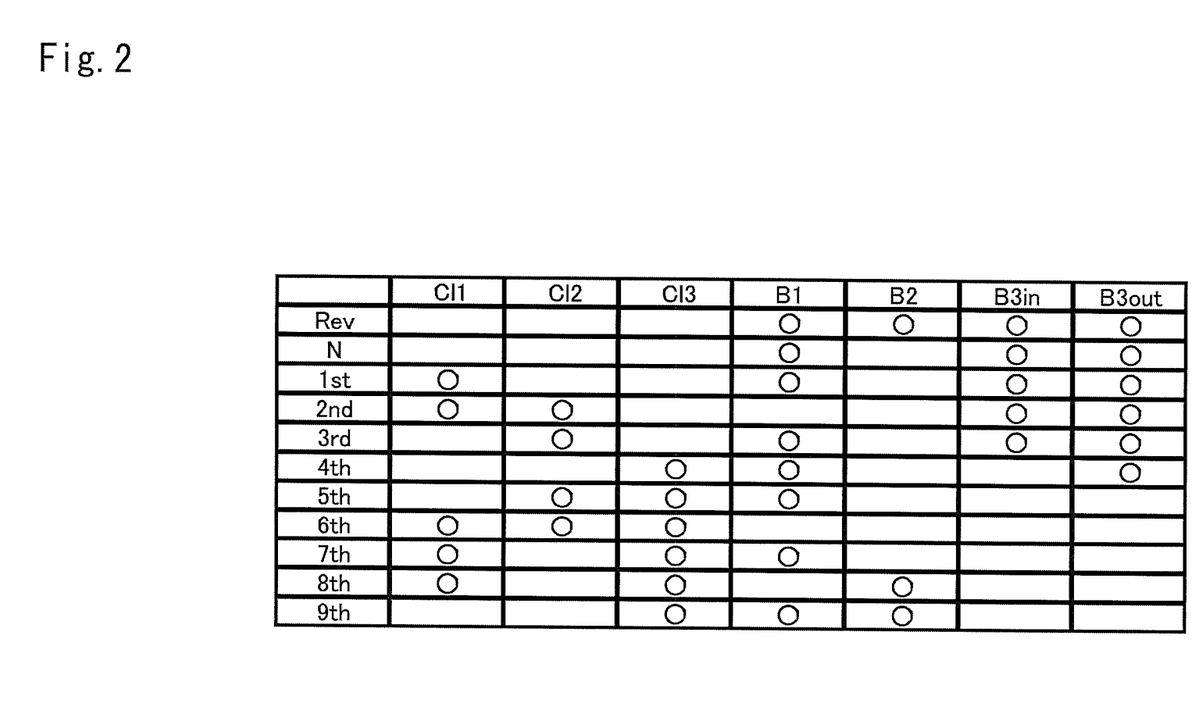
FIG. 2 shows an operation table which indicates the operation state of brakes and clutches in each gear stage of the automatic transmission according to the embodiment of the invention.

The control portion 10 controls the operation of the brakes B1 through B3 and the clutches Cl1 through Cl3 based on the operation table shown in FIG. 2 to establish nine forward speed gear stages and one reverse gear stage. In other words, the control portion 10 includes a hydraulic pressure control device which hydraulically controls supply of hydraulic pressure to each brake B1 through B3 and each clutch Cl1 through Cl3 to select the suitable speed gear stage in response to a vehicle running state (such as, for example, engine load, vehicle speed and so on). In FIG. 2, symbol "O" marked in the space of each brake and clutch corresponding to each speed stage indicates that the brake or the clutch is operated to establish the each corresponding speed stage. Particularly, in FIG. 2, symbol "O" marked in the brake "B3-in" indicates the state that the hydraulic pressure is supplied into the first hydraulic pressure chamber 45, which will be explained later in detail and the symbol "O" marked in the brake "B3-out" indicates the state that the hydraulic pressure is supplied into the second hydraulic pressure chamber 46 which will be also explained later in detail.

Figure 3:
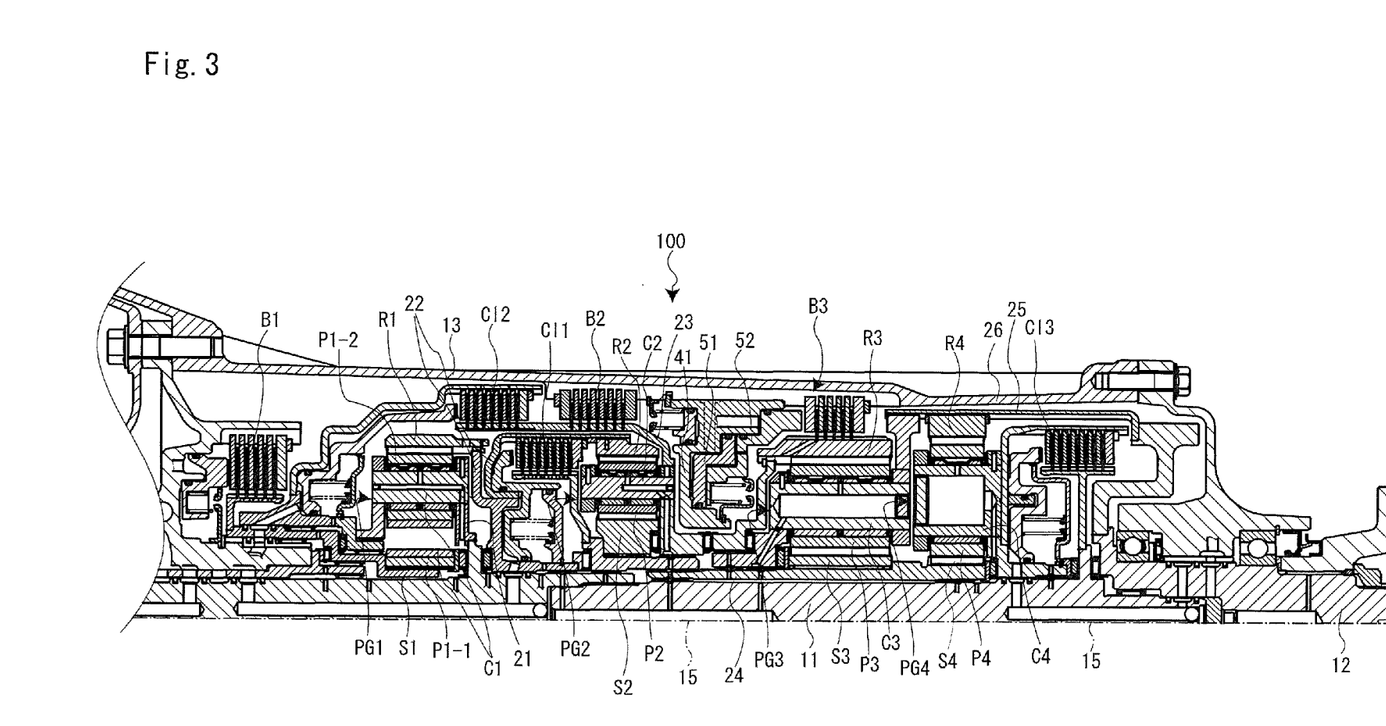
FIG. 3 is a cross-sectional view of the automatic transmission according to the embodiment of the invention.

FIG. 3 is a cross sectional view of the automatic transmission 100 according to the embodiment of the invention. The symbols or characters in FIG. 3 indicate the elements or components designated by the same symbols or the characters in FIG. 1.

(Concrete Structure of Third Brake)

Figure 4:
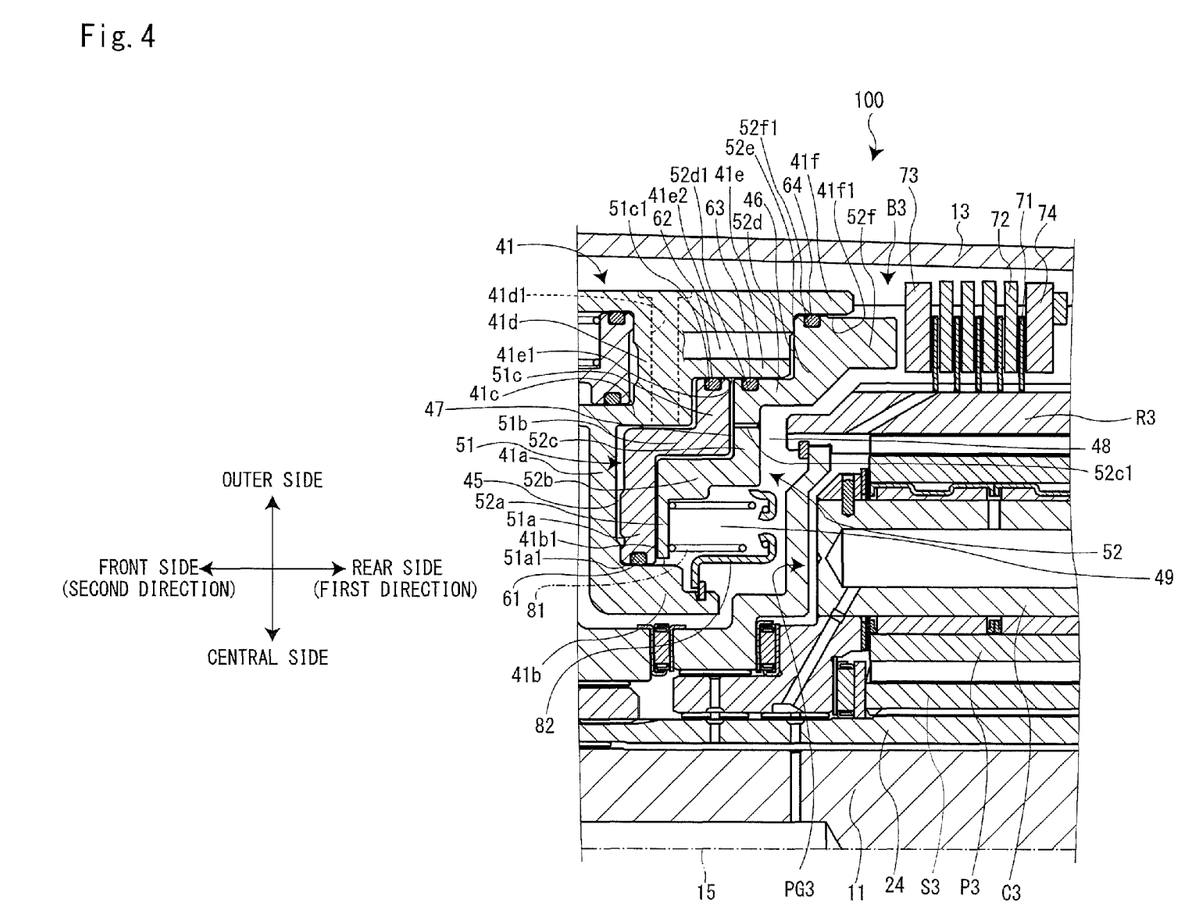
FIG. 4 is a cross-sectional view of the third brake

The detail structure of the third brake B3 will be explained hereinafter with reference to FIG. 4. The third brake B3 is a double chamber type brake having a first hydraulic pressure chamber 45 and a second hydraulic pressure chamber 46 and detail of the double chamber structure will be explained later. The third brake B3 functions for detachably connecting one element (the third ring gear R3 in this embodiment) of the third planetary gear mechanism PG3 to the housing 13. The third brake B3 includes a support member 41, an inner side piston 51, an outer side piston 52, a first O-ring 61, a second O-ring 62, a third O-ring 63, a fourth O-ring 64, a plurality of inner plates 71, a plurality of outer plates 72, an outer plate 73 to be pushed, a support outer plate 74, a plurality of return springs 81 and a spring support member 82. It is noted here that in FIG. 4, the top direction with respect to the drawing sheet indicates the outer side in a radial direction relative to the third brake B3, the bottom direction with respect to the drawing sheet indicates the central side in a radial direction relative to the automatic transmission 100 and the third brake B3, the left side of the drawing sheet indicates the front side (second direction) of the automatic transmission 100 and the third brake B3 and the right side of the drawing sheet indicates the rear side (first direction) of the automatic transmission 100 and the third brake B3.

The support member 41 is accommodated in the housing 13 and is in an annular circular shape. The support member 41 is formed by a first connecting portion 41*a*, a first cylindrical portion 41*b*, a second connecting portion 41*c*, a third connecting portion 41*d*, a second cylindrical portion 41*e* and a third cylindrical portion 41*f* and these are integrally formed as a unit.

The first connecting portion 41*a* is in an annular plate shape extending in a radial direction of the automatic transmission 100. The first cylindrical portion 41*b* is in a cylindrical shape and extends towards rearward from an inner edge portion of the first connecting portion 41*a*. The first cylindrical portion 41*b* is formed coaxially with the rotation axis line 15. The second connecting portion 41*c* is in a cylindrical shape and extends towards rearward from an outer edge portion of the first connecting portion 41*a*. The third connecting portion 41*d* is in an annular plate shape extending outwardly in a radial direction from the rear end of the second connecting portion 41*c*. The second cylindrical portion 41*e* is in a cylindrical shape and extends towards rearward from an outer edge portion of the third connecting portion 41*d*. The second cylindrical portion 41*e* is formed coaxially with the first cylindrical portion 41*b* at the outer peripheral side thereof. Thus, each front-end (one end side of the rotation axis line 15 direction) of the second cylindrical portion 41*e* and the first cylindrical portion 41*b* is connected with each other via the first connecting portion 41*a*, the second connecting portion 41*c* and the third connecting portion 41*d*.

The third cylindrical portion 41*f* is in a cylindrical shape and is connected to the rear end (the other end side of the rotation axis line 15 direction) of the second cylindrical portion 41*e*. The third cylindrical portion 41*f* is formed coaxially with the second cylindrical portion 41*e* at the outer peripheral side thereof. The inner diameter of the third cylindrical portion 41*f* is larger than the inner diameter of the second cylindrical portion 41*e*.

A first sliding surface 41*b*1 is formed on the outer peripheral surface of the first cylindrical portion 41*b*. A second sliding surface 41*e*1 is formed on the inner peripheral surface of the second cylindrical portion 41*e*. A third sliding surface 41*f*1 is formed on the inner peripheral surface of the third cylindrical portion 41*f*. The first sliding surface 41*b*1, the second sliding surface 41*e*1 and the third sliding surface 41*f*1 are coaxially formed centering about the rotation axis line 15. The first sliding surface 41*b*1, the second sliding surface 41*e*1 and the third sliding surface 41*f*1 are arranged along the rotation axis line 15 direction. The first and the second sliding surfaces 41*b*1 and 41*e*1 are arranged opposing to each other and the first sliding surface 41*b*1 is arranged further opposing to the third sliding surface 41*f*1. The sliding surfaces of the first, the second and the third sliding surfaces 41*b*1, 41*e*1 and 41*f*1 are formed by cutting and grinding to have a smoothing surface with the severely predetermined surface roughness or less.

The inner side piston 51 is in an annular shape. The annular shape used in this application means a rounded shape, including an annular plate shape and a stepped shape in cross section as indicated in the embodiment of the invention. The inner side piston 51 is formed by a first inner side piston portion 51a, a second inner side piston portion 51b and a third inner side piston portion 51c which are integrally formed. The first inner side piston portion 51a is in an annular plate shape and extends in a radial direction relative to the automatic transmission 100. The second inner piston portion 51b is in a cylindrical shape and extends rearward from an outer edge portion of the first inner side piston portion 51a. The third inner side piston portion 51c is in an annular plate shape and extends outwardly from a rear end of the second inner piston portion 51b. A first O-ring attaching recessed portion 51a1 is recessively provided at the inner peripheral edge (annular shaped inner edge) of the first inner side piston portion 51a over the entire periphery thereof. The first O-ring 61 is attached in the first O-ring attaching recessed portion 51a1. A second O-ring attaching recessed portion 51c1 is recessively provided at the outer peripheral edge (annular shaped outer edge) of the third inner side piston portion 51c over the entire periphery thereof. The second O-ring 62 is attached in the second O-ring attaching recessed portion 51c1. The first and the second O-rings 61 and 62 are formed by a material, such as a rubber or an elastomer which has an elasticity property. Thus, the inner edge of the inner side piston 51 is in contact with the first sliding surface 41b1 over the entire periphery thereof through the first O-ring 61 and at the same time the outer edge of the inner side piston 51 is in contact with the second sliding surface 41e1 over the entire periphery thereof through the second O-ring 62.

The inner side piston 51 is slidably provided in a space formed by the first cylindrical portion 41b and the second connecting portion 41c in a rotation axis line 15 direction at the rearward of the first connecting portion 41a and the third connecting portion 41d. A front surface of the first inner side piston portion 51a and a rear surface of the first connecting portion 41a are arranged opposing to each other. A front surface of the third inner side piston portion 51c and a rear surface of the third connecting portion 41d are also arranged opposing to each other. The first hydraulic pressure chamber 45 is formed in a space between the inner side piston 51 and the support member 41. The first O-ring 61 is in contact with the first sliding surface 41b1 over the entire periphery thereof. The second O-ring 62 is in contact with the second sliding surface 41e1 over the entire periphery thereof. Thus, the first hydraulic pressure chamber 45 is in air-tightly sealed. The third connecting portion 41d is provided with a first hydraulic passage 41d1 which is in communication with the first hydraulic pressure chamber 45.

The outer side piston 52 is formed by a first contacting portion 52a, a second contacting portion 52b and a third contacting portion 52c, a first piston cylindrical portion 52d, a piston connecting portion 52e and a second piston cylindrical portion 52f, which are all integrally formed. The first contacting portion 52a is in an annular plate shape and extends in a radial direction of the automatic transmission 100. The second contacting portion 52b is in a cylindrical shape and extends rearward from an outer edge portion of the first contacting portion 52a. The first contacting portion 52a, the second contacting portion 52b and the third contacting portion 52c correspond to the contacting portion of the invention (claims of the invention). These three contacting portions 52a through 52c are brought into contact with the inner side piston 51 (i.e. the first inner side piston portion 51a, the second inner side piston portion 51b and the third inner side piston 51c, respectively). In more detail, when a hydraulic pressure is not supplied into a first space 47 formed between the contacting portions 52a through 52c of the outer side piston 52 and the rear side of the inner side piston 51, the first contacting portion 52a and the third contacting portion 52c of the outer side piston 52 are brought into contact with the first inner side piston portion 51a and the third inner side piston portion 51c, respectively. However, when the hydraulic pressure is supplied into the first space 47, the first contacting portion 52a and the third contacting portion 52c are separated from the first inner side piston portion 51a and the third inner side piston portion 51c, respectively. It is noted that the second contacting portion 52b of the outer side piston 52 and the second inner side piston portion 51b are slidably in contact with each other regardless of the supply of the hydraulic pressure into the first space 47.

The third contacting portion 52c is in an annular plate shape and extends towards outer peripheral side from the rear end of the second contacting portion 52b. The third contacting portion 52c is provided with a plurality of communication holes 52c1 which fluidically connects the first space 47 formed between the contacting portions 52a through 52c of the outer side piston 52 and the rear side of the inner side piston 51 with the third contacting portion 52c at a rear side thereof. In other words, the plurality of communication holes 52c1 establishes fluid communication between the first space 47 and a second space 48 formed at the rear side of the outer side piston 52 across the contacting portions 52a through 52c of the outer side piston 52. The plurality of communication holes 52c1 allows air or liquid (also referred to collectively as fluid) in the first space 47 to be discharged to the second space 48 and vice versa, the fluid in the second space 48 flows into the first space 47 through the communication holes 52c1. In other words, the plurality of communication holes 52c1 controls the fluid communication between the first space 47 and the second space 48 when the outer side piston 52 moves relative to the inner side piston 51 in response to an expansion or contraction of the first space 47. Because of this air flow, a movement of the outer side piston 52 in a front/rearward direction relative to the inner side piston 51 will not be interfered and smoothly performed. The contacting portions 52a, 52b and 52c of the outer side piston 52 extend from the front-end of the first piston cylindrical portion 52d towards the inner peripheral side of the first piston cylindrical portion 52d.

The first piston cylindrical portion 52d is in a cylindrical shape and extends rearward from the outer edge portion of the third contacting portion 52c. The first piston cylindrical portion 52d is formed coaxially with the rotation axis line 15. The piston connecting portion 52e is in an annular plate shape and extends from the rear end of the first piston cylindrical portion 52d towards outer peripheral side thereof. The second piston cylindrical portion 52f is in a cylindrical shape and extends rearward from the outer edge portion of the piston connecting portion 52e. The second piston cylindrical portion 52f is formed coaxially with the first piston cylindrical portion 52d and provided at the outer peripheral side thereof. The outer diameter of the second piston cylindrical portion 52f is larger than the outer diameter of the first piston cylindrical portion 52d. The piston connecting portion 52e connects the rear end of the first piston cylindrical portion 52d and the front-end of the second piston cylindrical portion 52f.

A third O-ring attaching recessed portion 52d1 is recessively provided at the outer peripheral surface of the first piston cylindrical portion 52d over the entire periphery thereof. The third O-ring 63 is attached in the third O-ring attaching recessed portion 52d1. A fourth O-ring attaching recessed portion 52f1 is recessively provided at the outer peripheral surface of the second piston cylindrical portion 52f over the entire periphery thereof. The fourth O-ring 64 is attached in the fourth O-ring attaching recessed portion 52f1. The third and the fourth O-rings 63 and 64 are formed by a material, such as a rubber or an elastomer which has an elasticity property. Thus, the outer edge of the first piston cylindrical portion 52d of the outer side piston 52 is in contact with the second sliding surface 41e1 over the entire periphery thereof through the third O-ring 63 and at the same time the outer edge of the second piston cylindrical portion 52f of the outer side piston 52 is in contact with the third sliding surface 41f1 over the entire periphery thereof through the fourth O-ring 64.

The outer side piston 52 is arranged adjacent to the inner side piston 51 at the rearward thereof and is slidable in a rotation axis line 15 direction. The outer side piston 52 is detachably brought into contact with the inner side piston 51. The front surface of the first contacting portion 52a and the rear surface of the first inner side piston portion 51a are arranged opposing to each other. Further, the outer peripheral surface of the second contacting portion 52b and the inner peripheral surface of the second inner side piston portion 51b are arranged opposing to each other. The front surface of the third contacting portion 52c and the rear surface of the third inner side piston portion 51c are arranged opposing to each other. Thus, the contacting portions 52a, 52b and 52c are mutually adjacently arranged one another at rearward of the inner side piston 51. When the inner side piston 51 slidably moves in a rearward direction, the first inner side piston portion 51a is brought into contact with the first contacting portion 52a. Further, each of the contacting portions 52a through 52c is formed in a stepped shape in cross section and the inner side piston 51 is also formed in a stepped shape in cross section so that the corresponding shaped portions are in contact with the contacting portions 52a through 52c of the outer piston 52, respectively. A third space 49 is formed in a recessed shape across the outer side piston 52 opposite to the inner side piston 51.

The front-end surface of the piston connecting portion 52e and the rear end surface of the second cylindrical portion 41e are arranged opposing to each other. The second hydraulic pressure chamber 46 is formed in a space between the front-end surface of the piston connecting portion 52e and the rear end surface of the second cylindrical portion 41e. The third O-ring 63 is in contact with the second sliding surface 41e1 over the entire periphery thereof. The fourth O-ring 64 is in contact with the third sliding surface 41f1 over the entire periphery thereof. Thus, the second hydraulic pressure chamber 46 is fluid-tightly sealed. The second cylindrical portion 41e is provided with a second hydraulic passage 41e2 which is in communication with the second hydraulic pressure chamber 46.

The spring supporting member 82 is disposed rearward of the first contacting portion 52a and is fixed to the first cylindrical portion 41b. The spring supporting member 82 (spring retainer) is fixed to the support member 41 at one end and carries one end of each of the plurality of return springs 81 at the other end. The plurality of return springs 81 is provided in a circumferential direction between the first contacting portion 52a and the spring supporting member 82 and biases the outer side piston 52 in a frontward direction thereof. The return springs 81 are provided in the third space 49 and each one end is in contact with the contacting portions 52a through 52c of the outer side piston 52 to always bias the outer side piston 52 in the second direction (front side of the automatic transmission) opposite to the first direction (rear side). Any material as far as such material has an elasticity, may be used for the return spring. For example, a rubber material may be used as a substitute for the return spring, as a biasing member.

According to the embodiment, the inner side piston 51 is formed not in an annular plate shape, but in a bent shape such that the first inner side piston portion 51a is positioned frontward of the third inner side piston portion 51c. Further, the outer side piston 52 formed by the contacting portions 52a through 52c is formed not in an annular plate shape, but in a bent shape such that the first contacting portion 51a is positioned frontward of the third contacting portion 52c. Accordingly, a space (third space 49) can be provided between the rearward of the first contacting portion 52a and the third planetary gear mechanism PG3 and the spring supporting member 82 and the return springs 81 can be disposed in this third space 49. This can shorten the size of the automatic transmission 100 in an axial direction.

Each of the plurality of inner plates 71 is in an annular shape and is provided at the outer peripheral portion of the third ring gear R3. The inner plates 71 are movable in the rotation axis line 15 direction but are prevented from movement in a peripheral direction relative to the third ring gear R3. Each inner plate 71 is provided with a friction material at both sides thereof. Each of the plurality of outer plates 72 is in an annular shape and is provided at the inner peripheral portion of the housing 13. The outer plates 72 are movable in the rotation axis line 15 direction but are prevented from movement in a peripheral direction relative to the housing 13. The inner plates 71 and the outer plates 72 are provided alternatively in the rotation axis line 15 direction.

The outer plate 73 to be pushed is in an annular plate shape and adjacently provided frontward of the forward-most inner plate 71 of the plurality of inner plates 71 on the inner peripheral surface of the hosing 13. The outer plate 73 to be pushed is movable in the rotation axis line 15 direction but is prevented from movement in a peripheral direction relative to the housing 13. Under a state that the outer side piston 52 is positioned at the forward-most position within the sliding allowable range, the rear end of the second piston cylindrical portion 52f is arranged opposing to the outer plate 73 to be pushed with a certain distance apart from each other. The support outer plate 74 is in an annular plate shape and adjacently provided rearward of the rearmost inner plate 71 of the plurality of inner plates 71 on the inner peripheral surface of the hosing 13. The support outer plate 74 is movable in the rotation axis line 15 direction but is prevented from movement in a peripheral direction relative to the housing 13. Thus, the plurality of inner plates 71 is provided between the outer plates 72 (the outer plates 73 to be pushed and the support outer plate 74).

The first and the second hydraulic pressure chambers 45 and 46 are supplied with the hydraulic pressure independently with each other. When the hydraulic pressure is supplied to the second hydraulic pressure chamber 46, only the outer side piston 52 is moved rearward (in the first direction) due to the expansion of the second hydraulic pressure chamber 46 and the outer plate 73 to be pushed is pushed by the second piston cylindrical portion 52f and moved rearward (first direction). Then, the plurality of inner plates 71 and the plurality of outer plates 72 are squeezed between the outer plate 73 to be pushed and the support outer plate 74 thereby to generate friction force between each of the plurality of inner plates 71 and outer plates 72. Thus, the third brake B3 becomes engaged state. As a result, the third ring gear R3 is fixed to the housing 13. Under the state that the hydraulic pressure is supplied to the second hydraulic pressure chamber 46, when the hydraulic pressure is supplied to the first hydraulic pressure chamber 45, the inner side piston 51 is moved rearward and the inner side piston 51 pushes the outer side piston 52 rearward. Thus, the force that the second piston cylindrical portion 52f pushes the outer plate 73 to be pushed rearward further increases. Then the friction force generated between the plurality of inner and outer plates 71 and 73 increases to thereby increase the engaging torque generated at the third brake B3.

It is noted that according to the embodiment as shown in the Table of FIG. 2, when one of the first through third speed gear stages is established, both first and second hydraulic pressure chambers 45 and 46 are supplied with the hydraulic pressure and a large engaging torque is generated at the third brake B3. Further, when the hydraulic pressure is introduced into the first hydraulic pressure chamber 45, the volume of the first hydraulic pressure chamber 45 increases and the inner side piston 51 moves in the first direction (rearward) which is the direction where the inner side piston 51 is separated from the connecting portion (first connecting portion 41a), due to the expansion of the first hydraulic pressure chamber 45. This movement of the inner side piston 51 forces the contacting portions 52a through 52c of the outer side piston 52 to move in the first direction (rearward). Thus, an engaging torque required for the selected speed gear stage can be obtained by selecting the hydraulic pressure supply to any one of the following three ways: only to the first hydraulic pressure chamber 45, only to the second hydraulic pressure chamber 46 and both of the hydraulic pressure chambers 45 and 46.

When the hydraulic pressure which has been supplied to the first and/or the second hydraulic pressure chambers 45 and 46 is discharged, the outer side piston 52 is biased frontward by the biasing force of the return springs 81 and is moved forward by the contraction of the hydraulic pressure chambers 45 and/or 46. Then, the inner side piston 51 is pushed by the outer side piston 52 to move also forward. The second piston cylindrical portion 52f is separated from the outer plate 73 to be pushed. Thus, the friction force generated at the plurality of inner and outer plates 71 and 72 fades out. The third brake B3 becomes disengaged state. This will allow the third ring gear R3 to be rotated relative to the housing 13.

In the automatic transmission 100, when the fourth speed gear stage is established, the third brake B3 does not necessarily generate a large engaging torque. Therefore, according to the automatic transmission 100, the hydraulic pressure is supplied only to the second hydraulic pressure chamber 46, when the fourth speed gear stage is established. Since the third brake B3 of the automatic transmission 100 according to the embodiment adopts a double chamber type brake, the engaging force or torque can be variably generated in two steps depending on the necessity.

When the hydraulic pressure in the second hydraulic pressure chamber 46 is discharged, the outer side piston 52 is biased by the return springs 81 and is moved forward and due to the forward movement of the outer side piston 52, the second piston cylindrical portion 52f is separated from the outer plate 73 to be pushed. Thus, the friction force generated at the plurality of inner and outer plates 71 and 72 fades out. The third brake B3 becomes disengaged state. This will allow the third ring gear R3 to be rotated relative to the housing 13.

Effect of the Embodiment

According to the embodiment of the invention, the support member 41 is formed by the first cylindrical portion 41b which is provided with the first sliding surface 41b1 on the inner peripheral surface thereof, the second cylindrical portion 41e which is formed at the outer peripheral side of the first cylindrical portion 41b and is provided with the second sliding surface 41e1 on the inner peripheral surface thereof and the third cylindrical portion 41f having an inner diameter thereof being larger than the inner diameter of the second cylindrical portion 41e and connected to the rear end of the second cylindrical portion 41e (end portion of the other side of the rotation axis line 15 direction) the third cylindrical portion being provided with the third sliding surface 41f1 on the inner peripheral surface thereof. The inner edge of the inner side piston 51 is in contact with the first sliding surface 41b1 over the entire periphery thereof through the first O-ring 61 and the outer edge of the inner side piston 51 is in contact with the second sliding surface 41e1 over the entire periphery thereof through the second O-ring 62. The outer edge of the first piston cylindrical portion 52d of the outer side piston 52 is in contact with the second sliding surface 41e1 over the entire periphery thereof through the third O-ring 63 and the outer edge of the second piston cylindrical portion 52f of the outer side piston 52 is in contact with the third sliding surface 41f1 over the entire periphery thereof through the fourth O-ring 64. Thus, the outer edge of the inner side piston 51 and the outer edge of the first piston cylindrical portion 52d of the outer side piston 52 are in contact with the second sliding surface 41e1 over the entire periphery thereof which is common to both outer edges. Therefore, without forming four sliding surfaces at the support member 41, forming only three sliding surfaces can suffice to provide the double chamber type third brake B3. As a result, one sliding surface can be eliminated from the support member 41 thereby to reduce the cost of machining the sliding surface and accordingly, an automatic transmission 100 equipped with a double chamber type third brake B3 which can reduce the manufacturing cost.

The outer side piston 52 includes the first, second and third contacting portions 52a through 52c extending towards the inner peripheral surface side of the first piston cylindrical portion 52d and arranged adjacent to the inner side piston 51. Therefore, when the hydraulic pressure is supplied to the first hydraulic pressure chamber 45, the outer side piston 52 is surely pushed rearward by the inner side piston 51 by the provision of the first, second and third contacting portions 52a through 52c of the outer side piston 52. Further, the third contacting portion 52c is provided with the plurality of communication holes 52c1 which connects the space between the contacting portions 52a through 52c and the inner side piston 51 with the surface of the third contacting portion 52c opposite side to the inner side piston 51. The plurality of communication holes 52c1 allows the fluid in the first space 47 to be discharged to the second space 48 and vice versa, the fluid in the second space 48 flows into the first space 47 through the communication holes 52c1. Accordingly, the movement of the outer side piston 52 relative to the inner side piston 51 in a front/rearward direction cannot be interfered. As a result, a prompt generation of the engaging torque at the third brake B3 can be achieved.

The shape of the inner side piston 51 may be an annular plate shape. In this embodiment, the contacting portion connected to the front-end of the first piston cylindrical portion 52d of the outer side piston 52 and extending towards the inner peripheral side of the first piston cylindrical portion 52d is in an annular plate shape.

According to the embodiment, only the third brake B3 is shown as a double chamber type brake, however, the first brake B1, the second brake B2 may be formed in a double chamber type as similar to the shape of the third brake B3.

Figure 1:
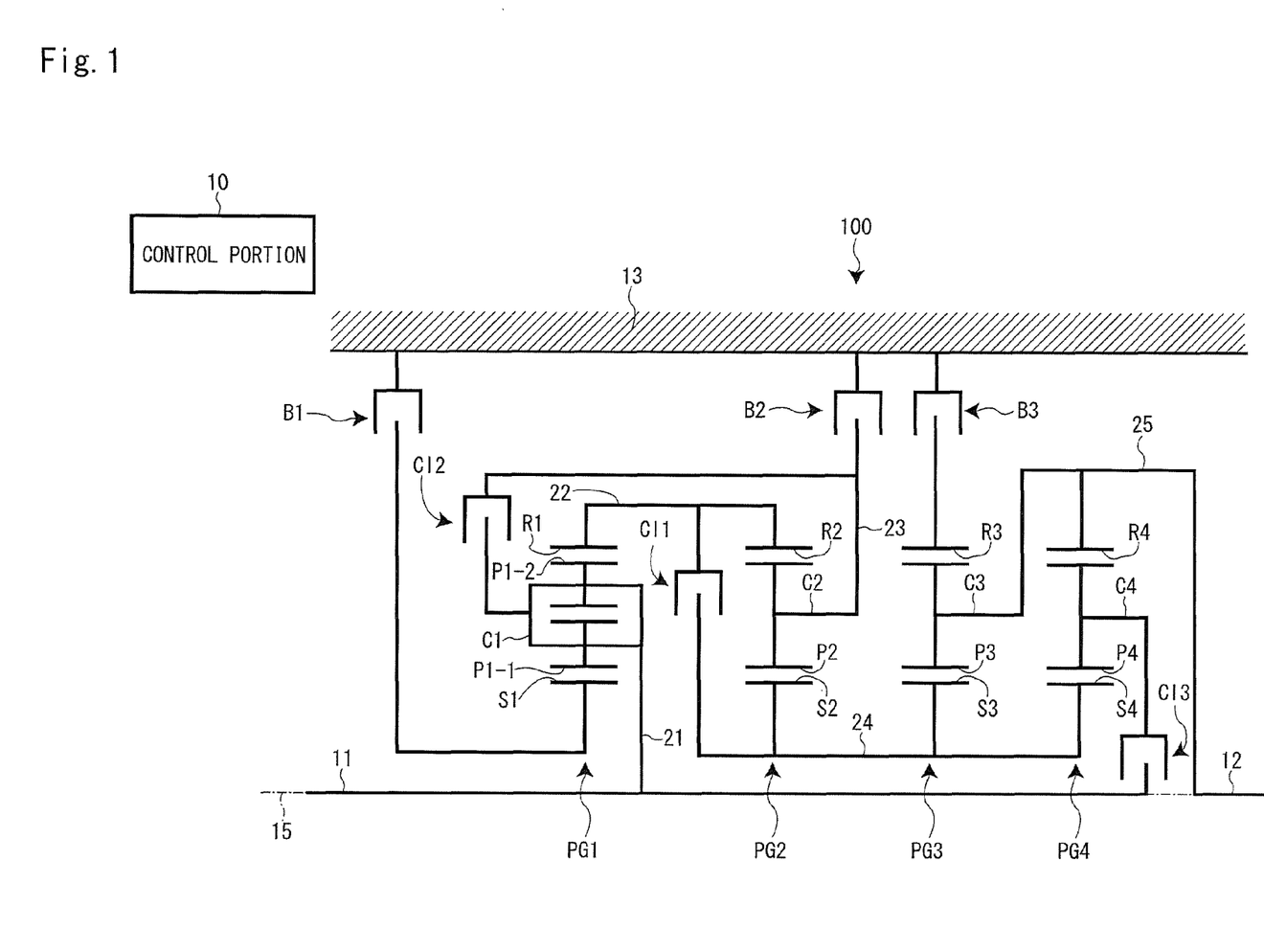
FIG. 1 is a skeleton view showing an automatic transmission according to an embodiment of the invention.

The double chamber type brake with three sliding surfaces, instead of four sliding surfaces, can be applicable not only to the automatic transmission 100 as shown in FIG. 1, but also to any other automatic transmission brakes. Obviously, numerous modifications and variations of the present invention are possible in light of the above teachings. It is therefore to be understood that within the scope of the appended claims, the present invention may be practiced otherwise than as specifically described herein.

REFERENCE SIGNS LIST

13; housing, 41; support member, 41a; first connecting portion (connecting portion), 41b; first cylindrical portion, 41b1; first sliding surface, 41c; second connecting portion (connecting portion), 41d; third connecting portion (connecting portion), 41e; second cylindrical portion, 41e1; second sliding surface 41f; third cylindrical portion, 41f1; third sliding surface, 45; first hydraulic pressure chamber, 46; second hydraulic pressure chamber, 47; first space, 48; second space, 49; third space, 51; inner side piston, 52; outer side piston, 52a; first contacting portion (contacting portion), 52b; second contacting portion (contacting portion), 52c; third contacting portion), 52c1; communication hole, 52d; first piston cylindrical portion, 52e; piston connecting portion, 52f; second piston cylindrical portion, 100; automatic transmission, 71; inner plate, 72; outer plate, 81; return spring (biasing member), 82; spring supporting member (supporting member), B3; third brake (double chamber type brake), R3; third ring gear (one element of the third planetary gear mechanism PG3), PG1; first planetary gear mechanism, PG2; second planetary gear mechanism, PG3; third planetary gear mechanism, PG4; fourth planetary gear mechanism.

What we claim is:

1. An automatic transmission comprising:
a housing;
a plurality of planetary gear mechanisms accommodated in the housing and arranged coaxially with a rotation axis line;
a double chamber brake having a first hydraulic chamber and a second hydraulic chamber for connecting or disconnecting one element of one of the plurality of planetary gear mechanisms to or from the housing, wherein
the double chamber brake includes;
a support member which is formed with a first cylindrical portion formed cylindrically and arranged coaxially with the rotation axis line, the first cylindrical portion having a first sliding surface on an outer peripheral surface thereof, a second cylindrical portion cylindrically formed and arranged coaxially with the first cylindrical portion at an outer peripheral surface side of the first cylindrical portion, the second cylindrical portion having a second sliding surface on an inner peripheral surface thereof, a connecting portion connecting the first cylindrical portion and the second cylindrical portion at each one end in a rotation axis line direction and a third cylindrical portion cylindrically formed and an inner diameter thereof being larger than an inner diameter of the second cylindrical portion and connected to the second cylindrical portion at another end thereof in the rotation axis line direction, the third cylindrical portion having a third sliding surface on an inner peripheral surface thereof;
an inner side piston provided with the first hydraulic pressure chamber between the connecting portion of the support member and the inner side piston, an annular shape inner edge portion of the inner side piston being in contact with an entire periphery of the first sliding surface of the first cylindrical portion of the support member and an annular shape outer edge portion being in contact with an entire periphery of the second sliding surface of the second cylindrical portion of the support member;
an outer side piston provided adjacent to the inner side piston, the outer side piston having a first piston cylindrical portion formed cylindrically and arranged coaxially with the rotation axis line, an outer edge portion of the first piston cylindrical portion being in contact with an entire periphery of the second sliding surface, a second piston cylindrical portion cylindrically formed and arranged coaxially at an outer peripheral surface side of the first piston cylindrical portion with the first piston cylindrical portion, an outer edge portion of the second piston cylindrical portion being in contact with an entire periphery of the third sliding surface and a piston connecting portion formed with the second hydraulic pressure chamber between the second cylindrical portion and the piston connecting portion and connecting the first piston cylindrical portion and the second piston cylindrical portion;
a plurality of outer plates, each having an annular plate shape and arranged along in the rotation axis line direction, the plurality of outer plates being prevented from moving in a peripheral direction relative to the housing and being allowed to be movable along the rotation axis line, the plurality of outer plates being pushed by the outer side piston; and
a plurality of inner plates, each having an annular plate shape and each being provided between the outer plates, the plurality of the inner plates being prevented from moving in a peripheral direction relative to the one element of the one of the plurality of planetary gear mechanisms and being allowed to be movable along the rotation axis line.

2. The automatic transmission according to claim 1, wherein,
the outer side piston includes a contacting portion formed opposing to the inner side piston and extending towards an inner peripheral side of the first piston cylindrical portion the contacting portion being in contact with the inner side piston.

3. The automatic transmission according to claim 2, wherein,
the inner side piston moves in a first direction where the inner side piston is separated from the connecting portion due to an expansion of the first hydraulic pressure chamber when a hydraulic pressure is supplied to the first hydraulic pressure chamber and the outer side piston moves in the first direction by a movement of the contacting portion accompanied by the movement of the inner side piston and wherein only the outer side piston moves in the first direction due to an expansion of the second hydraulic pressure chamber when a hydraulic pressure is supplied to the second hydraulic pressure chamber.

4. The automatic transmission according to claim 2, wherein,
   a communication hole is provided at the contacting portion of the outer side piston for fluidically connecting a first space formed between the contacting portion and the inner side piston and a second space formed at the opposite side to the first space across the contacting portion.

5. The automatic transmission according to claim 4, wherein,
   the communication hole controls fluid flow between the first space and the second space in response to an expansion or contraction of the first space caused by a movement of the outer side piston relative to the inner side piston.

6. The automatic transmission according to claim 1, wherein,
   the contacting portion is formed in a stepped shape in cross section and the inner side piston is formed in a corresponding stepped shape in cross section to be in contact with the contacting portion in the stepped shape in cross section.

7. The automatic transmission according to claim 1, further comprising:
   a third space recessively formed at an opposite side to the inner side piston across the contacting portion;
   a biasing member provided in the third space and contacting the contacting portion at one end thereof for biasing the contacting portion in an opposite direction to the first direction; and
   a biasing member supporting member fixed to the support member and supporting the other end of the biasing member.

\* \* \* \* \*